United States Patent

Lynes

[15] 3,643,230

[45] Feb. 15, 1972

[54] SERIAL STORAGE AND TRANSFER APPARATUS EMPLOYING CHARGE-STORAGE DIODES IN INTERSTAGE COUPLING CIRCUITRY

[72] Inventor: Dennis Joseph Lynes, Madison, N.J.

[73] Assignee: Bell Telephone Laboratories, Incorporated, Murray Hill, N.J.

[22] Filed: Sept. 3, 1970

[21] Appl. No.: 69,228

[52] U.S. Cl. ..........................340/173 FF, 307/221, 307/292, 307/317

[51] Int. Cl. ....................................G11c 11/34, H03k 3/286

[58] Field of Search .............340/173 FF; 307/221, 238, 292, 307/317

[56] References Cited

UNITED STATES PATENTS 3,423,737 1/1969 Harper..................................340/173

*Primary Examiner*—Terrell W. Fears

*Attorney*—R. J. Guenther and Arthur J. Torsiglieri

[57] ABSTRACT

In a serial digital storage arrangement bistable storage cells, each of which includes a pair of dual-emitter transistors, are diode coupled to a single-phase clock line and are concatenated via charge-storage diodes and Schottky barrier diodes. Signal currents are supplied primarily via the clock line through the coupling diodes and are substantially independent of standby current amplitudes. Application of a pulse to the clock line causes current to be diverted from the dual-emitter flip-flop transistors through the charge-storage diodes; and removal of the pulse from the clock line causes the charge stored in the charge-storage diodes to be conducted into one of the dual-emitter transistors of the next succeeding stage for setting the state thereof.

13 Claims, 1 Drawing Figure

PATENTED FEB 15 1972 3,643,230
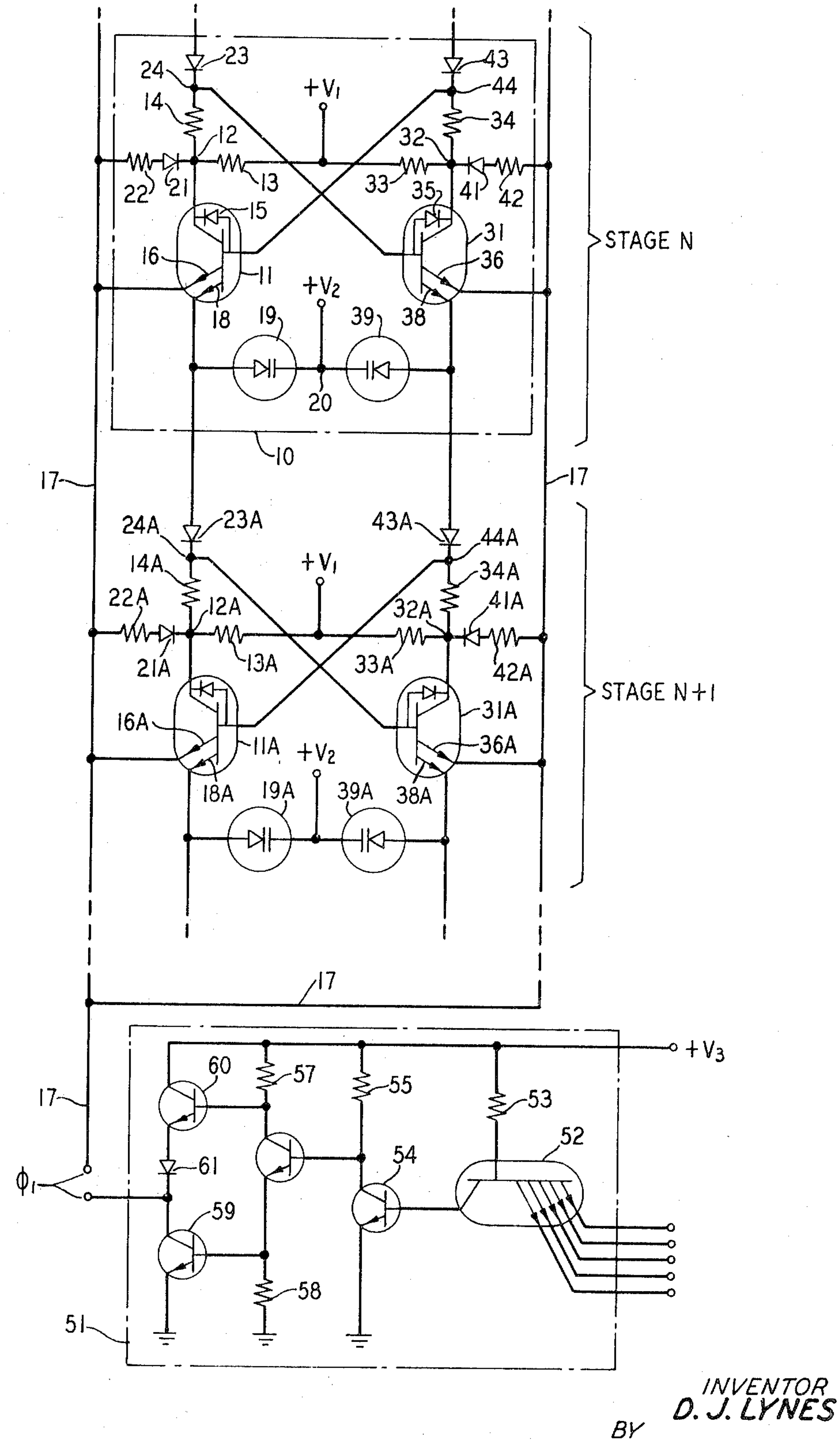
INVENTOR
D. J. LYNES
BY
A. J. Torsiglieri
ATTORNEY

SERIAL STORAGE AND TRANSFER APPARATUS EMPLOYING CHARGE-STORAGE DIODES IN INTERSTAGE COUPLING CIRCUITRY

BACKGROUND OF THE INVENTION

This invention relates to serial digital data-storage apparatus. For simplicity and clarity, the invention will be described primarily as embodied in a dual-rail shift register; although it will be understood the invention is of equal applicability in other forms of serial digital apparatus, e.g., counters and adders.

Shift registers generally include a plurality of identical cascaded single bit storage stages interconnected so that each stage assumes the state of a preceding stage upon command of a shift signal. Broadly, each stage comprises a storage element, e.g., a flip-flop, and a signal-coupling element. The coupling element includes an intermediate storage portion which is necessary to enable each stage to transfer its information prior to accepting an incoming signal, i.e., to avoid what in the art is termed a "race" condition.

Commonly in the prior art each stage of a shift register includes two flip-flops, one for bistable storage and one for coupling. This is disadvantageous for semiconductor integrated circuit applications because the use of a flip-flop for coupling is unduly complex and requires excessive semiconductor "real estate."

Other forms of coupling also have been proposed. The use of capacitors and diodes for coupling is disclosed in U.S. Pat. No. 3,316,426, issued Apr. 25, 1967, to I. Imahashi. The use of a Zener diode is disclosed in U.S. Pat. No. 3,198,960, issued Aug. 3, 1965, to J. F. Kruy. Unfortunately, both require circuit components which are not easily provided in semiconductor integrated circuit embodiments.

SUMMARY OF THE INVENTION

An object of this invention is an improved serial digital storage arrangement which is embodied advantageously in semiconductor integrated circuit form.

A further object of this invention is a serial digital storage arrangement which is operable at high speed with low power dissipation.

To these and other ends, an improved serial digital storage arrangement in accordance with my invention includes: (1) bistable storage elements including pairs of cross-coupled, dual-emitter transistors; (2) asymmetrically conducting means coupling the storage elements to control signal conduction paths; and (3) a coupling portion including pairs of charge-storage diodes and low-storage diodes.

By "asymmetrically conducting means" is meant a circuit element or group of circuit elements which presents a relatively high impedance with an applied voltage less than a given magnitude and a relatively low impedance with an applied voltage greater than the given magnitude, e.g., a diode. Ideally the asymmetrically conducting means would vary abruptly between infinite impedance and zero impedance as the applied voltage is varied across the given magnitude, typically an impedance ratio of $10^9$ is suitable.

More particularly in accordance with the presently preferred embodiment of my invention each bistable storage portion includes a flip-flop comprising a pair of cross-coupled, dual-emitter transistors, the collectors of which are coupled separately through load impedances to a source of DC potential. A first emitter of each transistor is coupled to a control signal conduction path which is common to all the stages. The collector of each transistor is coupled separately through asymmetrically conducting means to the same control signal conduction path. The second emitter of each transistor is coupled separately to the next stage via a pair of charge-storage diodes, e.g., PN-junction diodes, and a pair of low-storage diodes, e.g., Schottky-barrier diodes.

In operation the digital state of a given stage is stored and evidenced primarily by the conductive condition of the dual-emitter transistors of that stage. Information is shifted from one stage to the next by changing the voltage on the control signal conduction path from a first voltage (standby voltage or holding voltage) to a second voltage (shift voltage) and back to the first voltage.

In the standby mode (holding mode), the first voltage is maintained on the control signal conduction path. This first voltage is preadjusted in relation to all other applied voltages such that it is sufficient to maintain the asymmetrically conducting means in their higher impedance state so that the collectors of the cross-coupled transistors are substantially electrically decoupled from the control signal conduction path. This first voltage additionally is preadjusted such that standby current flowing through the cross-coupled transistors flows onto the control signal conduction path through the first emitters coupled thereto rather than through the second emitters into the coupling portion of the stage. In this mode the standby current in each bistable cell is supplied primarily from the DC source through the load impedances and can be made arbitrarily small to decrease standby power dissipation without deleteriously affecting the speed, signal amplitudes, or noise margins, as will now be described.

To initiate the shifting of information from each stage to the next, the voltage on the control signal conduction path is switched from the standby voltage to a second voltage. This second voltage is of sufficient magnitude to cause the current flowing through the cross-coupled transistors to flow through the second emitters into the coupling portion of each stage rather than through the first emitters coupled to the control signal conduction path. This second voltage also is of sufficient magnitude to cause the asymmetrically conducting means to assume their low impedance state and to conduct signal current from the control signal conduction path into the bistable storage portion of the stage. This signal current, in addition to the standby current, flows through the cross-coupled transistors and into the coupling portion of the stage where it flows through the charge-storage diodes, storing a charge therein. Returning the control signal voltage to the standby voltage causes the stored charge to flow from the charge-storage diodes through the low-storage diodes and into the cross-coupled transistors of the next succeeding stage for setting the state thereof.

It should now be recognized from the summary that an important advantage of my invention is that signal currents are substantially independent of standby currents. For this reason, standby power dissipation can be made arbitrarily low without affecting the dynamic (shifting) performance of the apparatus.

Another important advantage of my invention is that there is no standby power dissipated in the coupling portion of a stage in my apparatus. Also, very little power is dissipated in the coupling portion during the shifting mode.

Still further, it will be apparent that the summarized apparatus is readily embodied in semiconductor integrated circuit form, typically in a monolithic silicon integrated circuit form.

BRIEF DESCRIPTION OF THE DRAWING

The invention will be better understood by considering the following more detailed description in conjunction with the accompanying drawing in which the FIGURE shows a schematic circuit diagram of two successive stages, N and N+1, intermediate in a cascade of like stages forming a shift register in accordance with the presently preferred embodiment of my invention. The stages are shown interconnected by a control signal conduction path which is common to all the stages and which is shown connected to appropriate circuitry for driving it. In the figure, stage N+1 is in all respects identical to stage N; and, accordingly, the elements in stage N+1 are denoted by the same reference numeral as the corresponding element in stage N, but with a suffix A attached.

DETAILED DESCRIPTION

With reference now to the drawing, the figure shows two identical stages, N and N+1, intermediate in a cascade of stages forming a dual-rail shift register. For clear demarcation, the elements comprising stage N are shown enclosed within a broken line rectangle 10.

As shown, the bistable storage portion of stage N includes a pair of cross-coupled, dual-emitter NPN-transistors 11 and 31, the collectors of which are connected separately to internal circuit nodes 12 and 32, respectively, and then through a pair of load impedances 13 and 33 to a source of DC potential $V_1$. The cross-coupling paths include a pair of resistors 14 and 34, resistor 14 being connected in the path coupling the collector of transistor 11 to the base of transistor 31 and resistor 34 being connected in the path coupling the collector of transistor 31 to the base of transistor 11. For optimum operation, a pair of antisaturation diodes 15 and 35, e.g., Schottky-barrier diodes, are shown connected between the base and collector of transistors 11 and 31, respectively, to prevent those transistors from becoming saturated in operation.

One emitter, 16 and 36, of each transistor is shown connected to a control signal conduction path 17 (commonly termed a "clock line" in the art) which is common to all the stages. The other emitters 18 and 38 are connected separately to the anodes of a pair of charge-storage diodes 19 and 39. The cathodes of diodes 19 and 39 are connected to a common internal circuit node 20 to which a second source of DC potential $V_2$ also is connected.

The collectors of transistors 11 and 31 additionally are coupled to clock line 17 through a pair of asymmetrically conducting means shown illustratively as diodes 21 and 41, respectively, in series with resistors 22 and 42, respectively. Of course, other asymmetrically conducting means such as transistors or circuit apparatus comprising diodes, transistors, and/or other circuit elements may also be used.

And finally, providing the direct link for transferring information from one stage to the next are a pair of low-charge-storage diodes 23 and 43, e.g., Schottky-barrier diodes, connected between the bases of cross-coupled transistors 11 and 31 and the anodes of the charge-storage diodes of the preceding stage (not shown). Note in stage N+1, low-charge-storage diodes 23A and 43A are connected between the bases of transistors 31A and 11A, respectively, and the anodes of charge-storage diodes 19 and 39, respectively, in stage N.

Also shown in the figure is an illustrative clock line driver circuit within broken line rectangle 51 for applying appropriate voltages and currents to clock line 17 in operation. Clock line driver circuit 51 includes an input junction transistor 52 having multiple emitters, one for each digit of an input binary address, if selection is desired. The base of transistor 52 is connected by way of a resistor 53 to the positive terminal of a third source of electric potential $V_3$. The collector of transistor 52 is connected to the base of an inverter transistor 54, the collector of which is connected through a resistor 55 to $V_3$ and the emitter of which is connected to an electrical ground. The collector of transistor 54 also is connected to the base of an emitter follower transistor 56, the collector of which is connected through a resistor 57 to $V_3$ and the emitter of which is connected through a resistor 58 to ground. The emitter of transistor 56 also is connected to the base of an output transistor 59 whose emitter is connected to ground. The collector of transistor 59 is coupled to $V_3$ through a conventional "up-down" driver circuit including in series the collector-emitter circuit of a transistor 60 and a diode 61. The base of transistor 60 is connected to the collector of transistor 56 and additionally is coupled through resistor 57 to $V_3$.

In operation the stages normally are maintained in the holding mode by clamping clock line 17 at or near to ground voltage through a low impedance. This is effected by clamping one or more of the emitters of transistor 52 to some voltage less than two diode drops (typically about 1.4 v.) such that current flowing through resistor 53 flows through those one or more emitters of transistor 52 rather than through base-collector junction of transistor 52. In this condition, inverter transistor 54 is turned off; and current flowing through resistor 55 flows into the base of transistor 56. This turns on transistor 56 which turns off transistor 60 and which saturates transistor 59. Thus in this condition clock line 17 is clamped at one transistor-saturation voltage (typically about 0.2 v.) through saturated transistor 59 to ground.

Power supply voltages $V_1$ and $V_2$ (for example, about 1.2 and 3.0 v., respectively) are arranged such that any current flowing through transistors 11 and 31 flows through emitters 16 and/or 36 and onto clock line 17 rather than through emitters 18 and 38 into the coupling portion of the stage. It will be appreciated that this desired current condition normally obtains with $V_1$=1.2 v., $V_2$=3.0 v., and a clock line voltage of about 0.2 v.

To illustrate in more detail the operation, assume the above-described holding condition is maintained and a digital "bit" is stored in stage N in such manner that transistor 11 is turned on and transistor 31 is turned off. Inasmuch as the voltage on clock line 17 necessarily is less than the voltage at nodes 12 and 13, coupling diodes 21 and 41 are nonconducting. Thus, the current flowing through transistors 11 and/or 31 is supplied only through load impedances 13 and 33 which may be arbitrarily large, e.g., 20,000 ohms. Because transistor 11, by assumption, is on, one current flows through load impedance 13 into the collector of transistor 11 and a smaller current flows through impedances 33 and 34 and into the base of transistor 11. As described above, emitter 18 is nonconducting; and emitter 16 conducts the collector current and the base current onto clock line 17. Little or no current flows through transistor 31 because of the cross-coupling.

Note that in this holding mode no current can flow through diodes 23A and 43A into stage N+1 because the bases of transistors 11A and 31A (to which the cathodes of diodes 23A and 43A are connected) necessarily are at a greater voltage than the emitters of transistors 11 and 31 (to which the anodes of diodes 23A and 43A are connected), since all stages are connected to the same clock line 17 and to the same power supply voltages $V_1$ and $V_2$.

To shift information from each stage to the next, the voltage on clock line 17 is increased to a voltage sufficiently greater than $V_2$ such that current flowing through transistors 11 and 31 flows through emitters 18 and 38 rather than emitters 16 and 36. This is effected by switching all of the emitters of transistor 52 of the driver circuit to a voltage greater than two diode drops such that the current flowing through resistor 53 flows through the base-collector junction of the transistor 52 and into the base of transistor 54 rather than through any of the emitters of that transistor. In this condition transistor 54 turns on, which causes transistor 56 to turn off, which causes transistor 59 to turn off and transistor 60 to turn on in the active mode. With transistor 59 off and transistor 60 on, the voltage applied to clock line 17 will rise to about $V_3$ minus the voltage drop over diode 61 (typically about 0.7 v.) and minus the voltage drop across the base-emitter junction of transistor 60 (again typically about 0.7 v.). Thus the voltage applied to clock line 17 will be about $V_3$ minus 1.4 v. For purposes of illustration, with $V_1$=1.2 v. and $V_2$=3.0 v., a convenient value of $V_3$ is about 7 v., which results in application of about 5.6 v. to clock line 17 during the shift mode.

It will be appreciated that applying 5.6 v. to emitters 16 and 36 will cause current flowing through transistors 11 and 31 to flow through emitters 18 and 38 and through charge-storage diodes 19 and 39 rather than through emitters 16 and 36. Inasmuch as transistor 11 was, by assumption, turned on, significantly more current will flow through emitter 18 than through emitter 38 and correspondingly more charge will be stored in diode 19 than in diode 39.

The voltage at node 12 will be about $V_2$ plus the voltage drop across charge-storage diode 19 (typically about 0.7 v.) plus the voltage drop (typically about 0.2 v.) between the collector and the emitter 18 of turned-on transistor 11, for a total of about 3.9 v. Similarly, the voltage at node 32 will be about $V_2$ plus the voltage drop across charge-storage diode 19 plus the base-emitter voltage (about 0.7 v.) of transistor 11 plus a very small voltage drop (about 0.1–0.2 v.) across resistor 34, for a total of about 4.6 v. Thus, with 5.6 v. on clock line 17 both diodes 21 and 41 are forward biased and conduct current from the clock line into the collector and base, respectively, of transistor 11. This additional current into the cell is supplied by transistor 60 of the clock line driver circuit and is used to enhance the signal current amplitude without concomitant increase in holding mode current amplitude.

At this point it must be understood that the term "charge-storage diode", as commonly used in the art and as used in this specification, refers to a diode having an intentionally large charge-storage characteristic in the forward-biased direction. While the forward current is flowing, minority carriers are stored in the lattice structure of the semiconductor material of the diode. As is well known, the quantity of charge stored is, to a first-order approximation, determined by the current flowing through the diode multiplied by the recombination time for minority carriers in the diode. Recombination times of 40 nanoseconds for such devices are common in the art. Advantageously the recombination time should be at least 20 nanoseconds. This is readily achieved in conventional semiconductor integrated circuits. Thus, if a current of 1 mil ampere flows through a charge-storage diode with a 40 nanosecond recombination time, about 40 picocoulombs will be stored in the diode. Most of this charge can be recovered and put to effective circuit use by abruptly reverse biasing the charge-storage diode and allowing it to discharge into a relatively low impedance.

In storage apparatus in accordance with my invention the shifting of information from one stage to the next is completed by allowing the charge-storage diodes of the one stage to discharge into the transistors of the next stage for setting the state thereof. This is effected by switching the voltage on clock line 17 back to the standby voltage. This causes diodes 21 and 41 and emitters 18 and 38 to become nonconducting and causes emitters 16 and 36 to resume conducting.

As the voltage on clock line 17 is diminished to the standby level, the voltages at nodes 12A and 32A are reduced such that both diodes 23A and 43A become forward biased. Because emitters 18 and 38 are nonconducting the charge stored in diodes 19 and 39 discharges through diodes 23A and 43A into the transistors 11A and 31A of stage N+1. Diodes 23A and 43A by way of contrast are chosen to have recombination times of less than 1 nanosecond.

More particularly, when the clock line voltage is abruptly reduced from shift voltage to standby voltage, a voltage of approximately $V_2$ appears at node 24A (between resistor 14A and diode 23A) because charge-storage diode 19 does not give up its forward bias until after its stored charge has been discharged. At the same time, substantially less than $V_2$ appears at node 44A (between resistor 34A and diode 43A) because most of $V_2$ is dropped across diode 39 since it was not conducting. Thus there is a voltage imbalance between the bases of transistors 11A and 31A such as to tend to turn on transistor 31A. Diode 19 discharges through diode 23A into the base of transistor 31A, turning it on. As transistor 31A turns on, its collector current is supplied primarily from $V_1$ through resistor 33A. After the charge in diode 19 has been substantially discharged, normal holding mode operation as described hereinabove obtains.

Resistors 14, 34, 14A, 34A, etc., are employed primarily to aid in switching the state of a bistable cell if such is required during shifting. More particularly, in the above-described shift if transistor 11A had been on prior to the shift, it would be necessary that 11A be turned off and 31A be turned on. For this operation, resistor 14A operates to reduce the amount of charge from diode 19 that is wasted as collector current in 11A before 11A turns off. That is, a voltage develops over resistor 14A so as to speed up the process of turning on transistor 31A and turning off transistor 11A. About 1,000 ohms typically is suitable for resistors 14, 34, 14A, 34A. This size impedance is readily fabricated as a collector series resistance in integrated circuit form, as will be appreciated by those in the art.

Similarly, resistors 22, 42, 22A, and 42A, in series with diodes 21, 41, 21A and 41A, respectively, serve primarily to limit the amount of signal current drawn from the clock line during the shift mode. About 1,000 ohms is typically suitable; and, of course, these can be fabricated advantageously as parasitic resistance in series with their respective diodes.

Although it will be apparent to those in the art, it should be noted that the shift register shown in the figure complements the stored logical signals during each shift. That is, a "1" stored in stage N (transistor 11 on and transistor 31 off) is stored as a "0" in stage N+1 (transistor 31A on and transistor 11A off) after a first shift and, further, is stored as a "1" again in stage N+2. This is usually no problem; but system designs must account for the complementing. If the complementing is not desired, it can be avoided simply by reversing the connections between each stage. For example, the anode of diode 19 could as well be connected to the anode of diode 43A (rather than to diode 23A as shown) and the anode of diode 39 would then be connected to the anode of diode 23A (rather than to diode 43A as shown).

A second embodiment of my invention can be understood by considering a modification of the circuit shown in the figure. Assume that the first emitters 16 and 36, instead of being coupled to the clock line, are connected together and through a common resistor ($R_E$) to ground. Then, when the clock line voltage is increased to initiate shifting, the additional current coupled n through diodes 21 and 41 would result in developing an increased voltage over $R_E$. This increased voltage could be made to turn off emitters 16 and 36 to force current to flow through emitters 18 and 38 as described hereinabove. The rest of the operation would be as described hereinabove. A suitable value for $R_E$ would normally be between 1,000 and 5,000 ohms.

This second embodiment has the advantage of decreased parasitic capacitive loading on the clock line and may be a controlling consideration for some applications.

Although my invention has been described in part by making detailed reference to certain specific embodiments, such detail is intended to be and will be understood to be instructive rather than restrictive. It will be appreciated by those in the art that many variations may be made in the structure and modes of operation without departing from the spirit and scope of my invention as disclosed in the teachings contained herein. Of course, for example, the dual-emitter transistors need not be NPN as described, but may as well be PNP provided a corresponding reversal of voltage polarities and diode polarities also is made.

What is claimed is:

1. A serial digital storage arrangement comprising a plurality of cascaded stages and a control signal conduction path to which the plurality of stages are connected, each stage comprising

- a bistable storage element including a pair of cross-coupled, dual-emitter transistors;
- a pair of low-storage diodes;
- a pair of charge-storage diodes having first corresponding electrodes thereof connected to a common terminal adapted for connection to a first source of DC voltage and having the other corresponding terminals of each connected to one of the emitters of the dual-emitter transistors and additionally connected through a separate one of the low-storage diodes of the next succeeding stage to the base of one of the dual-emitter transistors in said next succeeding stage; and
- a pair of asymmetrically conducting means, one of which is connected between the control signal conduction path and the collector of each dual-emitter transistor.

2. Apparatus as recited in claim 1, further characterized in that an asymmetrically conducting means includes a diode.

3. Apparatus as recited in claim 2, further characterized in that an asymmetrically conducting means includes a low-storage diode.

4. Apparatus as recited in claim 2, further characterized in that an asymmetrically conducting means includes a Schottky-barrier diode.

5. Apparatus as recited in claim 1, further characterized in that the other emitters of the dual-emitter transistors are coupled to the control signal conduction path.

6. Apparatus as recited in claim 1, further characterized in that the other emitters of the dual-emitter transistors are connected together to a common node which in turn is connected through a resistor to a terminal adapted for connection to a source of reference potential.

7. Apparatus as recited in claim 1 wherein the charge-storage diodes are PN-junction diodes.

8. Apparatus as recited in claim 7 wherein the PN-junction diodes have a minority carrier recombination time of greater than about 20 nanoseconds.

9. Apparatus as recited in claim 1 wherein the low-storage diodes connecting the charge-storage diodes to the base of the dual-emitter transistors in the next succeeding stage are Schottky-barrier diodes.

10. Apparatus as recited in claim 1, further characterized in that a bistable storage element includes a pair of load impedances connecting separately the collectors of the dual-emitter transistors to a terminal adapted for connection to a second source of DC voltage.

11. Apparatus as recited in claim 1, further characterized in that a resistor is connected in series between the collector in each dual-emitter transistor and the base of the other dual-emitter transistor.

12. Apparatus as recited in claim 1, further characterized in that a resistor is connected in series between the asymmetrically conducting means and the control signal conduction path.

13. Apparatus as recited in claim 1 in combination with driver circuit means including:

means for maintaining a first voltage on said control signal conduction path during a standby period; and means for providing both a different voltage and signal currents to the stages through the control signal conduction path and the asymmetrically conducting means during a shifting period so that the signal current amplitudes within and between the stages are substantially independent of standby current amplitudes.

* * * * *